US012795231B2

(12) United States Patent
Chen et al.

(10) Patent No.: US 12,795,231 B2
(45) Date of Patent: Nov. 10, 2026

(54) METHOD AND SYSTEM FOR AUTOMATICALLY ACQUIRING TARGET INFORMATION

(71) Applicant: SOLOMON TECHNOLOGY CORPORATION, Taipei City (TW)

(72) Inventors: Cheng-Lung Chen, Taipei City (TW); Xuan Loc Nguyen, Taipei City (TW); Ren-Jie Chen, Taipei City (TW); Chia-Yun Lee, Taipei City (TW); Yu-Yen Liu, Taipei City (TW)

(73) Assignee: SOLOMON TECHNOLOGY CORPORATION, Taipei City (TW)

( * ) Notice: Subject to any disclaimer, the term of this patent is extended or adjusted under 35 U.S.C. 154(b) by 69 days.

(21) Appl. No.: 19/093,568

(22) Filed: Mar. 28, 2025

(65) Prior Publication Data

US 2025/0317645 A1 Oct. 9, 2025

Related U.S. Application Data

(63) Continuation-in-part of application No. 18/781,664, filed on Jul. 23, 2024, now Pat. No. 12,639,855.

(30) Foreign Application Priority Data

Apr. 3, 2024 (TW) ................................ 113112669

(51) Int. Cl.
*H04N 23/60* (2023.01)
*G06V 10/14* (2022.01)
(Continued)

(52) U.S. Cl.
CPC ............. *H04N 23/64* (2023.01); *G06V 10/14* (2022.01); *G06V 30/1444* (2022.01); *H04N 23/661* (2023.01)

(58) Field of Classification Search
CPC ...... H04N 23/64; H04N 23/661; G06V 10/14; G06V 30/1444
See application file for complete search history.

(56) References Cited

U.S. PATENT DOCUMENTS 6,639,625 B1 * 10/2003 Ishida .................. H04N 1/0402 348/E5.053
9,676,389 B2 * 6/2017 Clarke ............ B60W 30/18163
(Continued)

FOREIGN PATENT DOCUMENTS

CN 113814992 A 12/2021
CN 117765436 A 3/2024
(Continued)

OTHER PUBLICATIONS

Search Report issued to European counterpart application No. 24193060.1 by the EPO on Jan. 24, 2025.
(Continued)

*Primary Examiner* — Chiawei Chen
(74) *Attorney, Agent, or Firm* — HSML P.C.

(57) ABSTRACT

A method for automatically acquiring target information, the method is to be implemented by a system that includes a control device and a mobile camera device. The mobile camera device includes a camera that has a long distance camera module and a two-dimensional mirror. The method includes: the control device controlling the mobile camera device to move to an actual location in a space, and controlling the mobile camera device to obtain an initial image; the control device generating an adjustment instruction based on a target position data set and a discrepancy between the initial image and a reference image, and transmitting the adjustment instruction to the mobile camera device; the mobile camera device rotating the two-dimensional mirror to a target angle based on the adjustment
(Continued)

instruction; and the mobile camera device controlling the long distance camera module to capture and transmit a target image to the control device.

12 Claims, 6 Drawing Sheets

(51) Int. Cl.
*G06V 30/14* (2022.01)
*H04N 23/661* (2023.01)

(56) References Cited

U.S. PATENT DOCUMENTS

| | | | | |
|---|---|---|---|---|
| 2011/0043515 | A1* | 2/2011 | Stathis | G01C 15/002 434/118 |
| 2015/0281572 | A1* | 10/2015 | Pongratz | G06T 5/20 348/207.1 |
| 2016/0080625 | A1* | 3/2016 | Itoh | H04N 23/74 348/234 |
| 2016/0112676 | A1* | 4/2016 | Guo | G06T 3/4038 382/284 |
| 2017/0091923 | A1* | 3/2017 | Siercks | G01C 15/006 |
| 2017/0191822 | A1* | 7/2017 | Becker | G06T 7/33 |
| 2020/0355499 | A1* | 11/2020 | Hinderling | G01C 1/04 |
| 2021/0158562 | A1* | 5/2021 | Nakamura | H04N 23/54 |
| 2021/0311476 | A1 | 10/2021 | Li et al. | |
| 2021/0383506 | A1* | 12/2021 | Braunreiter | F41G 3/145 |
| 2022/0300000 | A1 | 9/2022 | Poluboiarinov | |
| 2023/0381970 | A1 | 11/2023 | Khansari Zadeh et al. | |
| 2023/0384795 | A1 | 11/2023 | Karapetyan et al. | |
| 2024/0022806 | A1* | 1/2024 | Kudo | G06T 7/74 |
| 2025/0307988 | A1* | 10/2025 | Nishita | G01S 17/08 |

FOREIGN PATENT DOCUMENTS

| | | | |
|---|---|---|---|
| TW | 201636959 | A | 10/2016 |
| TW | I656421 | B | 4/2019 |
| TW | 202026946 | A | 7/2020 |

OTHER PUBLICATIONS

Search Report appended to an Office Action, which was issued to Taiwanese counterpart application No. 113112669 by the TIPO on Nov. 1, 2024, with an English translation thereof (2 pages).

* cited by examiner

METHOD AND SYSTEM FOR AUTOMATICALLY ACQUIRING TARGET INFORMATION

CROSS-REFERENCE TO RELATED APPLICATION

This is a continuation-in-part application of U.S. patent application Ser. No. 18/781,664, filed on Jul. 23, 2024, which claims priority to Taiwanese Invention Patent Application No. 113112669, filed on Apr. 3, 2024. The aforesaid applications are incorporated by reference herein in their entirety.

FIELD

The disclosure relates to a method and a system for automatically acquiring target information.

BACKGROUND

Generally, in order to monitor operating status of equipment installed in a factory and/or acquire environmental information of the factory in real time, various detecting or measuring meters with different functions are set up on the equipment and/or in the factory, and personnel must be sent regularly to each meter to read and collect measurement data from the meter. However, the aforementioned way of collecting data from various meters not only requires additional manpower, but also requires additional management, and is prone to human error such as misreading or omission of some of the meters.

SUMMARY

Therefore, an object of the disclosure is to provide a method and a system for automatically acquiring target information that can alleviate at least one of the drawbacks of the prior art.

According to an aspect of the disclosure, the method for automatically acquiring target information is to be implemented by a system that includes a control device and a mobile camera device. The mobile camera device includes a camera that has a long distance camera module and a two-dimensional (2D) mirror. The 2D mirror is configured to rotate to different angles to allow the long distance camera module to capture images of different angles through the 2D mirror. The control device stores a reference image, and a reference coordinate set, a reference shooting data set and a target position data set that are related to the reference image. The reference coordinate set corresponds to an actual location in a space. The reference image is captured by the mobile camera device at the actual location using the reference shooting data set. The target position data set is position data related to a position of a partial image of the reference image within the reference image. The partial image corresponds to a target object in the space. The method includes: the control device controlling the mobile camera device to move to the actual location in the space according to the reference coordinate set, and controlling the mobile camera device to obtain an initial image using the reference shooting data set; the control device, in response to obtaining the initial image, determining a discrepancy between the initial image and the reference image; the control device generating an adjustment instruction based on the target position data set and the discrepancy between the initial image and the reference image, and transmitting the adjustment instruction to the mobile camera device; the mobile camera device, in response to receipt of the adjustment instruction, rotating the 2D mirror to a target angle based on the adjustment instruction; and the mobile camera device, after rotating an angle of the 2D mirror to the target angle, controlling the long distance camera module to capture a target image of the target angle through the 2D mirror, and transmitting the target image to the control device. The target image is related to the target object at the actual location.

According to another aspect of this disclosure, the system for automatically acquiring target information includes a control device and a mobile camera device. The control device stores a reference image, and a reference coordinate set, a reference shooting data set, and a target position data set that are related to the reference image. The reference coordinate set corresponds to an actual location in a space. The reference image is captured at the actual location using the reference shooting data set. The target position data set is position data related to a position of a partial image of the reference image within the reference image. The partial image corresponds to a target object in the space. The mobile camera device is electrically coupled with and controlled by the control device. The mobile camera device includes a camera that includes a long distance camera module and a 2D mirror. The 2D mirror is configured to rotate to different angles to allow the long distance camera module to capture images of different angles through the 2D mirror. The control device is configured to control the mobile camera device to capture the reference image. The control device is further configured to control the mobile camera device to move to the actual location in the space according to the reference coordinate set, and control the mobile camera device to obtain an initial image using the reference shooting data set. The control device is further configured to, in response to obtaining the initial image, determine a discrepancy between the initial image and the reference image, generate an adjustment instruction based on the target position data set and the discrepancy between the initial image and the reference image, and transmit the adjustment instruction to the mobile camera device. The mobile camera device is configured to, in response to receipt of the adjustment instruction, rotate the 2D mirror to a target angle based on the adjustment instruction, and after rotating an angle of the 2D mirror to the target angle, control the long distance camera module to capture a target image of the target angle through the 2D mirror, and transmit the target image to the control device. The target image is related to the target object at the actual location.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
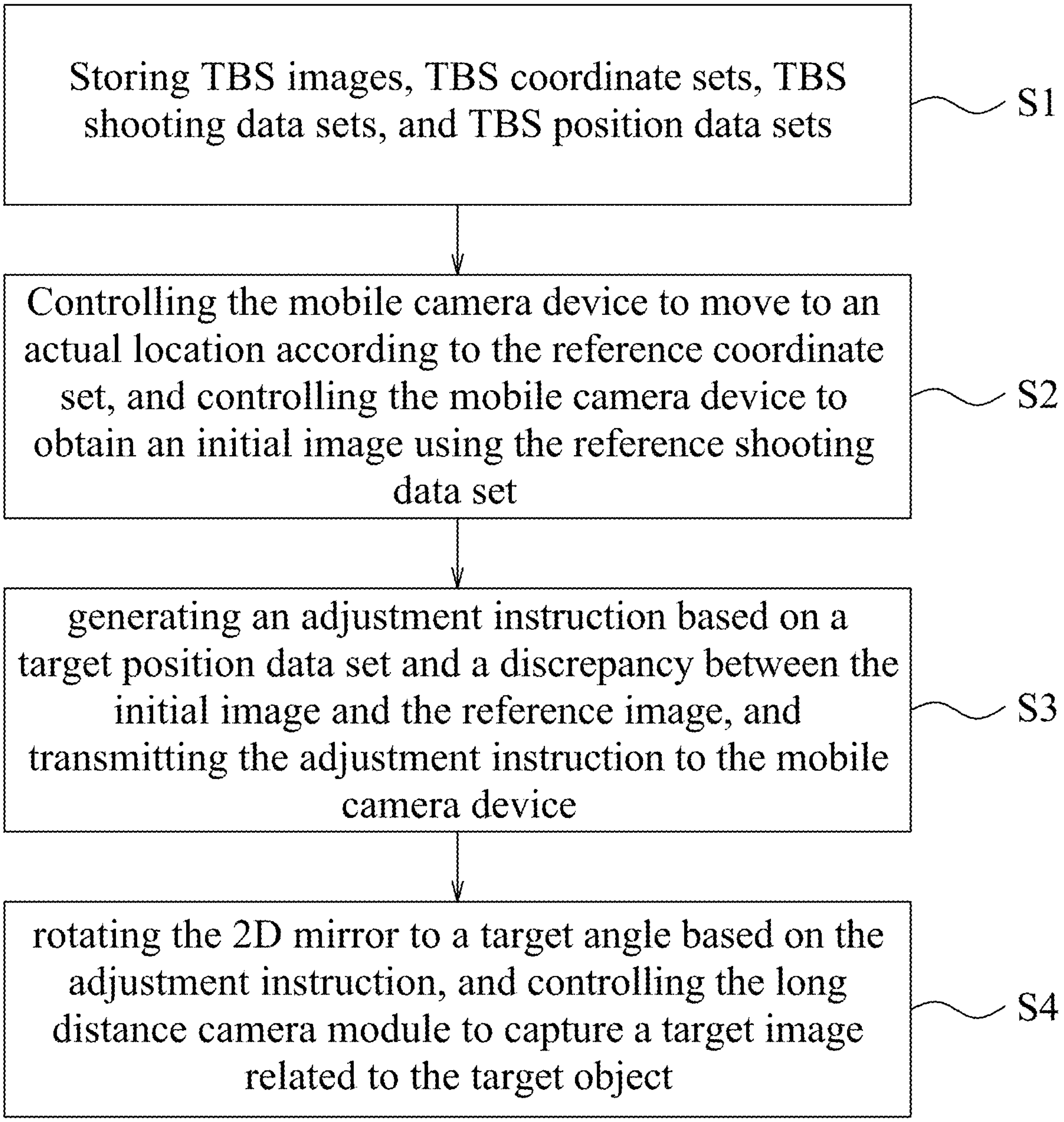
FIG. 1 is a flow chart of a method for automatically acquiring target information according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Referring to FIG. 1, a flow chart illustrating a method for in automatically acquiring target information according to this disclosure is presented. The method is to be implemented by a system shown in FIG. 2 for automatically acquiring target information according to an embodiment of this disclosure. The system includes a control device 1, and a mobile camera device 2 that is electrically coupled with and controlled by the control device 1. For example, the control device 1 is a server that may be embodied as a computer. The mobile camera device 2 includes a mobile body 21, a camera 22 that is disposed on the mobile body 21, and a control unit 23 for controlling the mobile body 21 and the camera 22. The mobile body 21 may use a mechanism/structure of a mobile robot, such as an automated guided vehicle (AGV), a sweeping robot, a vacuum cleaner, a food delivery robot, a drone or a humanoid robot, or a mobile robot for achieving automatic meter reading (AMR). In this embodiment, the camera 22 includes a long distance camera module 221, a two-dimensional (2D) mirror 222, and a large field-of-view (FOV) camera module 223. In some embodiments, the large FOV camera module 223 may be omitted. The 2D mirror 222 is configured to rotate to different angles to allow the long distance camera module 221 to capture images of different angles through the 2D mirror 222.

For example, the long distance camera module 221 is embodied using a combination of an industrial camera (not shown) that is exemplified by a Basler® acA2440-75um, an extender that is exemplified by a Computar® EX2C, a narrow-angle objective lens (not shown) that is exemplified by a Computar® M5028_MPW3, and a focus tunable lens (not shown) that is exemplified by an Optotune™ EL-16-40-TC-VIS-5D-M27, but the long distance camera module 221 is not limited to such. The 2D mirror 222 is exemplified by a fast steering mirror, for example, an Optotune™ MR-15-30, but the 2D mirror 222 is not limited to such. In some embodiments, the 2D mirror 222 may be connected to a base unit (not shown) to form a fast steering mirror development kit such as an Edmund Optics® MR-E-2. The large FOV camera module 223 is embodied using, for example, a depth camera (e.g., a D455 depth camera by Intel® RealSense™), or a combination of another industrial camera (not shown) that may be exemplified by a Basler® acA2440-75uc and a wide-angle objective lens (not shown) that may be exemplified by a Computar® M0528_MPW3, but the large FOV camera module 223 is not limited to such.

The control unit 23 is configured to, in response to receipt of data from the control device 1, control operations of the mobile body 21 and the camera 22 based on the data received from the control device 1.

The control unit 23 may include, but is not limited to, at least one of, a multi-core processor, a microprocessor, a digital signal processor (DSP), a field programmable gate array (FPGA), an application special integrated circuit (ASIC) and a radio frequency integrated circuit (RFIC).

In this embodiment, the control device 1 is configured to wirelessly communicate with the mobile camera device 2 via wireless communication technique such as Wi-Fi®, Bluetooth®, and ZigBee®. In some embodiments, the control device 1 may be electrically connected to and integrated with the mobile camera device 2 directly, where in such embodiments, the control device 1 is disposed on the mobile camera device 2 so as to move along with the mobile camera device 2.

Referring to FIG. 1, the method includes steps S1 to S4. In step S1, the control device 1 stores a plurality of to-be-selected (TBS) images, a plurality of TBS coordinate sets, a plurality of TBS shooting data sets, and a plurality of TBS position data sets. Each of the TBS images has at least one target object therein. For each of the TBS images, a respective one of the TBS coordinate sets and a respective one of the TBS shooting data sets are related to the TBS image, and a respective one of the TBS position data sets is related to the target object in the TBS image. It should be noted that the control device 1 may store the above-mentioned data prior to implementing the method.

Each of the TBS coordinate sets corresponds to an actual location in a space (e.g., a factory). In this embodiment, the control device 1 further stores a digital map of the space, and the digital map includes a plurality of TBS checkpoints corresponding respectively to various actual locations in the space. Each of the TBS coordinate sets is a coordinate set of a respective one of the TBS checkpoints in the digital map.

Figure 3:
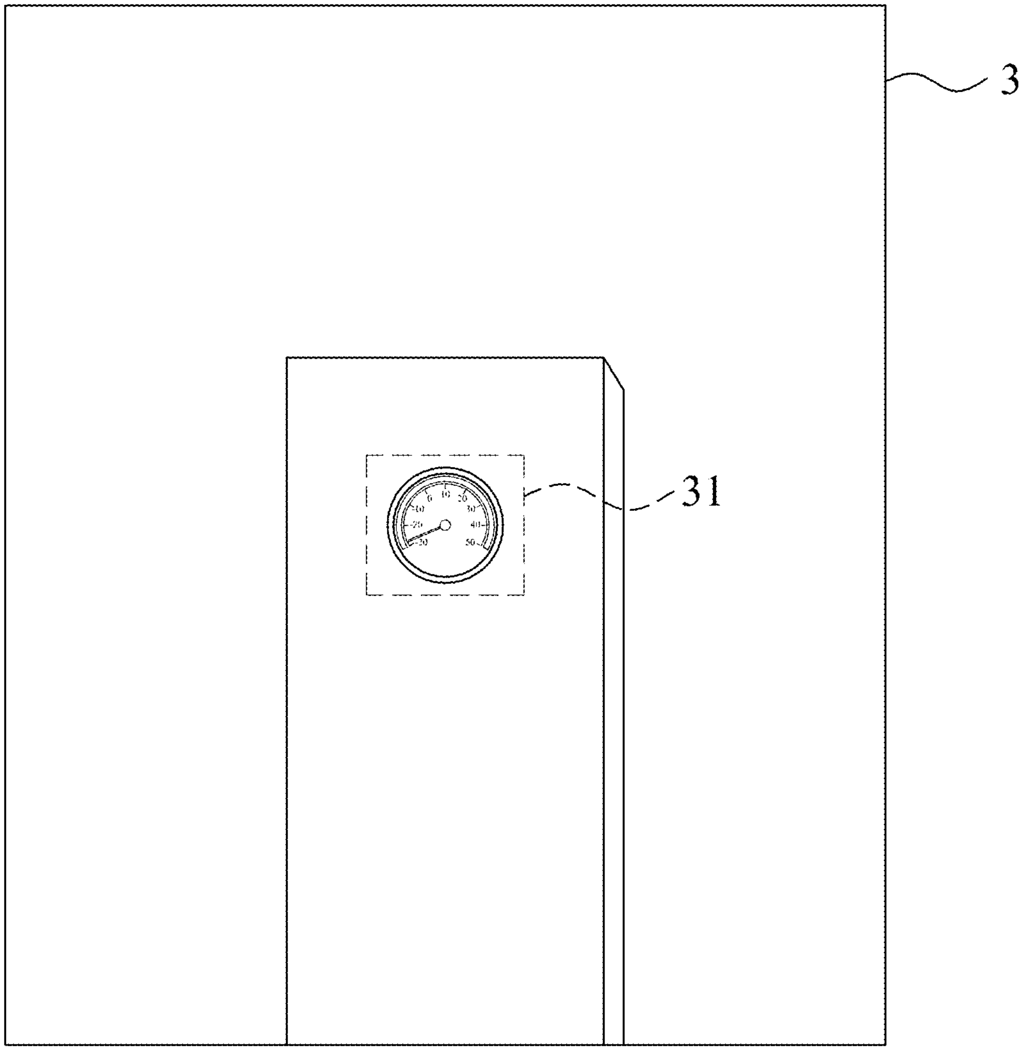
FIG. 3 shows a reference image to be used as a standard in the method for automatically acquiring target information.

Referring to FIG. 3, an example of one of the TBS images 3 is shown. Each of the TBS images is captured in advance by the mobile camera device 2 at the corresponding actual location in the space. For each of the TBS images, the mobile camera device 2 uses the camera 22 and the TBS shooting data set that corresponds to the TBS image to capture the TBS image. The TBS shooting data set is related to orientation or posture of the mobile camera device 2. In one embodiment, each of the TBS shooting data sets includes, but is not limited to, a turning angle of the mobile camera device 2 for controlling a direction in which the camera 22 is facing, so that the camera 22 may face directly at a target object at the actual location. The digital map may be generated by the mobile camera device 2 in advance, for example, by applying a conventional method of constructing an environmental map using a mobile robot with vision; however, the disclosure is not limited to thus.

Each of the TBS position data sets is position data related to a position of a partial image of the corresponding one of the TBS images. The partial image corresponds to a target object in the space (i.e., an image of the target object). For example, each of the TBS position data sets may be location coordinates of a center of the partial image. For example, the target object is exemplified as a meter (e.g., a water meter, an electric meter, a pressure meter, a thermometer, a humidity meter, etc., and not limited to such). In the example of the TBS image 3 shown in FIG. 3, a partial image 31 is an image of the target object which is a meter.

The control device 1 is configured to first display the digital map through a display (not shown) and allow an operator to select one of the TBS checkpoints in the digital map as a current checkpoint. Then, the control device 1, in response to the selection of the current checkpoint from among the TBS checkpoints, selects one of the TBS images that corresponds to the current checkpoint as a reference image (e.g., the reference image 3 shown in FIG. 3), selects one of the TBS coordinate sets that corresponds to the reference image as a reference coordinate set, selects one of the TBS shooting data sets that corresponds to the reference image as a reference shooting data set, and selects one of the TBS position data sets that corresponds to the reference image as a target position data set.

Figure 2:
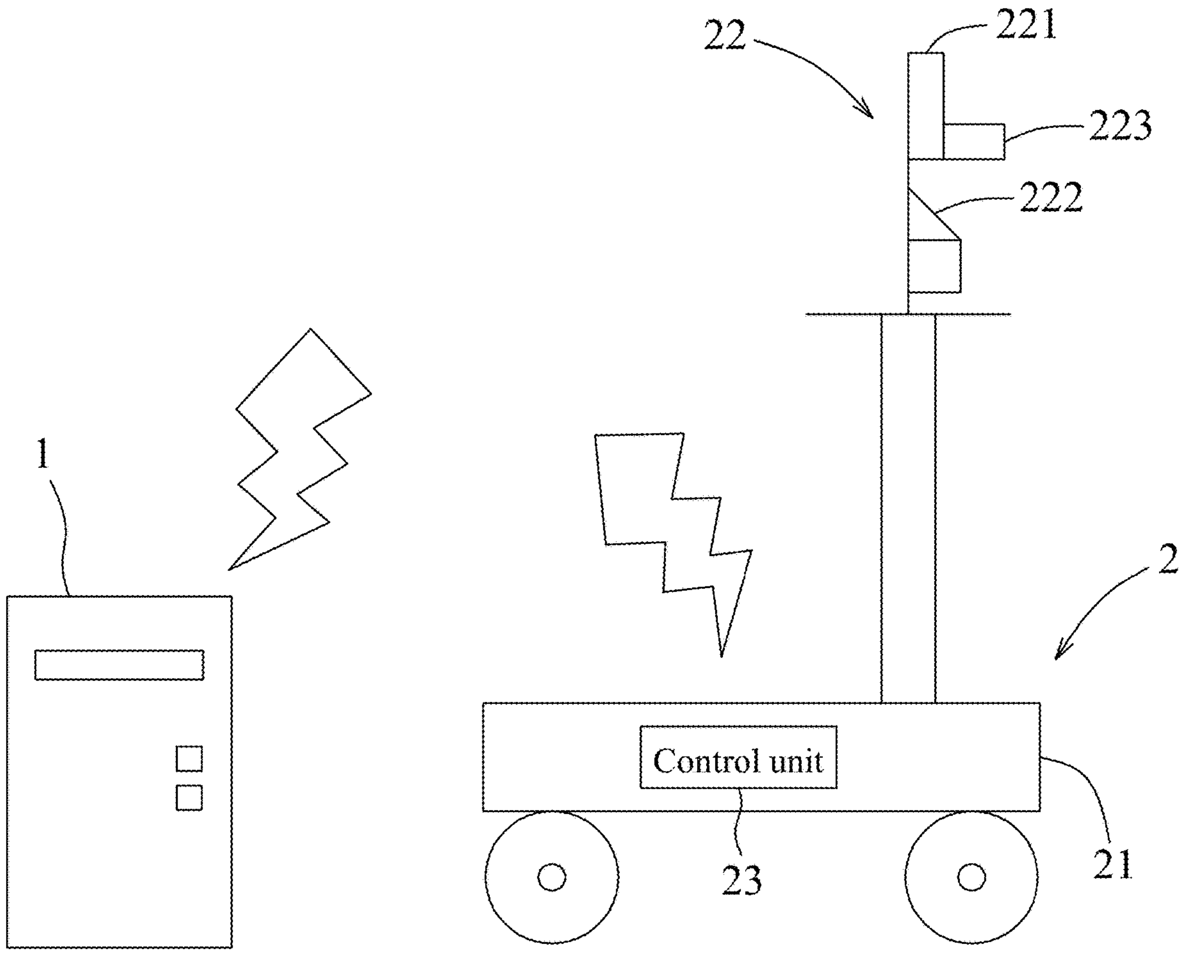
FIG. 2 is a schematic view of a system for automatically acquiring target information according to an embodiment of this disclosure.
Figure 4:
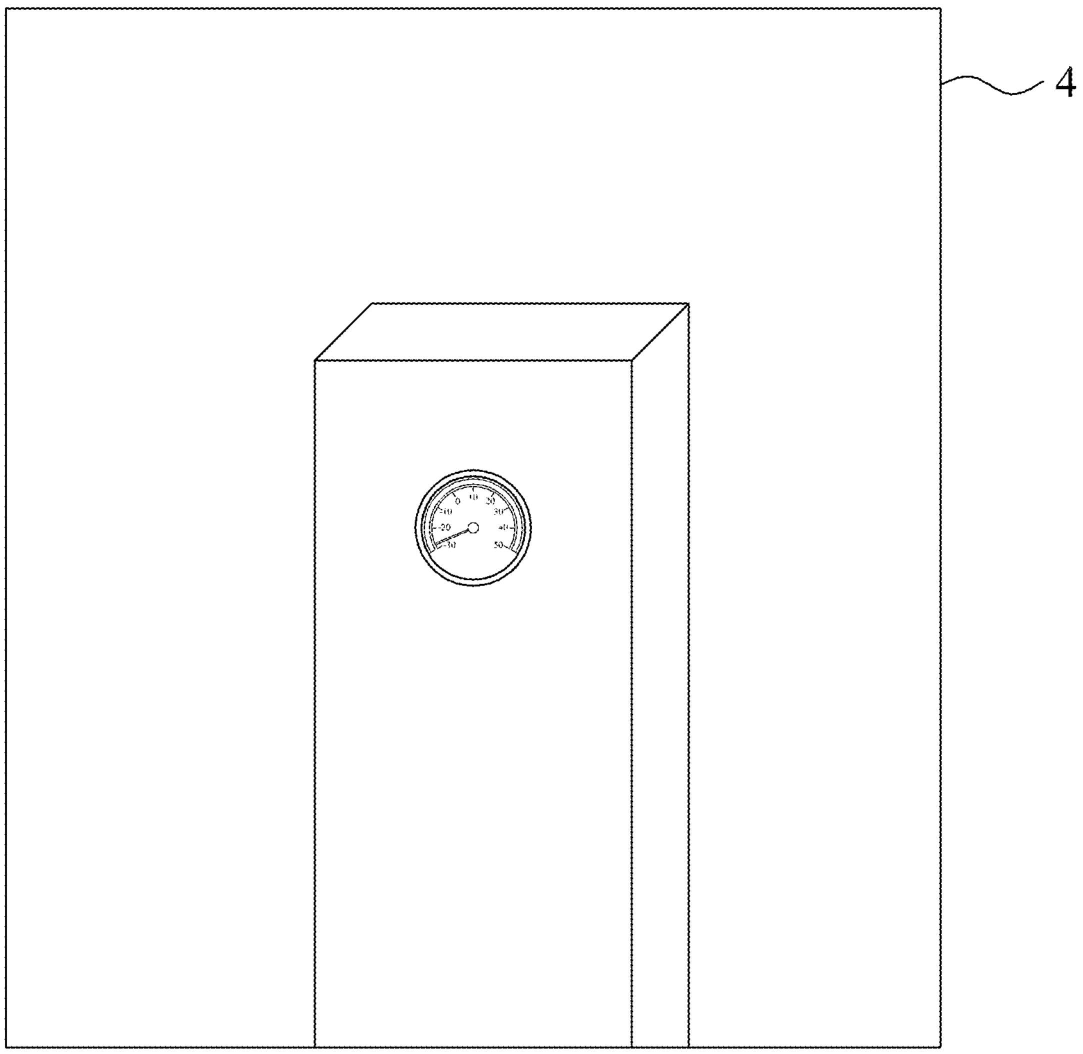
FIG. 4 shows an initial image initially obtained by the system for automatically acquiring target information.

Then, referring to FIGS. 1, 2, and 4, in step S2, the control device 1 controls the mobile camera device 2 to move to one of the actual locations in the space according to the reference coordinate set, and controls the camera 22 of the mobile camera device 2 to obtain an initial image 4 (as shown in FIG. 4) using the reference shooting data set. That is to say, in response to receipt of the data from the control device 1 (i.e., the reference coordinate set), the control unit 23 controls the mobile body 21 to move the mobile camera device 2 based on the data received from the control device 1. In this embodiment, the control device 1 obtains the initial image 4 by controlling the large FOV camera module 223 to directly capture the initial image 4.

In step S3, in response to obtaining the initial image 4, the control device 1 determines a discrepancy between the initial image 4 and the reference image 3. For example, comparing FIG. 3 (i.e., the reference image 3) and FIG. 4 (i.e., the initial image 4), it can be seen that the initial image 4 is not taken from a shooting angle that is the same as the shooting angle in which the reference image 3 was taken. This difference in shooting angle may result from errors in mechanism or movement of the mobile camera device 2 each time the mobile camera device 2 is moved or turned, even though the mobile camera device 2 uses the same reference shooting data set used to capture the reference image 3 to obtain the initial image 4 at the same actual location according to the same reference coordinate set. If the discrepancy is not calibrated immediately, it is likely that the camera 22 will not be able to capture the target object (i.e., the meter) accurately and an image thus captured may not clearly include the target object. In this embodiment, the control device 1 uses the method disclosed in Taiwanese Patent No. 1834495 to calculate the discrepancy between the shooting angle of the initial image 4 and that of the reference image 3.

The control device 1 then generates an adjustment instruction based on the target position data set and the discrepancy (i.e., the difference in shooting angles) between the initial image 4 and the reference image 3, and transmits the adjustment instruction to the mobile camera device 2. The adjustment instruction indicates a target angle of the 2D mirror 222 at which the 2D mirror 222 directly faces the target object, and the target angle is determined by the control device 1 according to the discrepancy between the initial image 4 and the reference image 3 and the target position data set.

Figure 5:
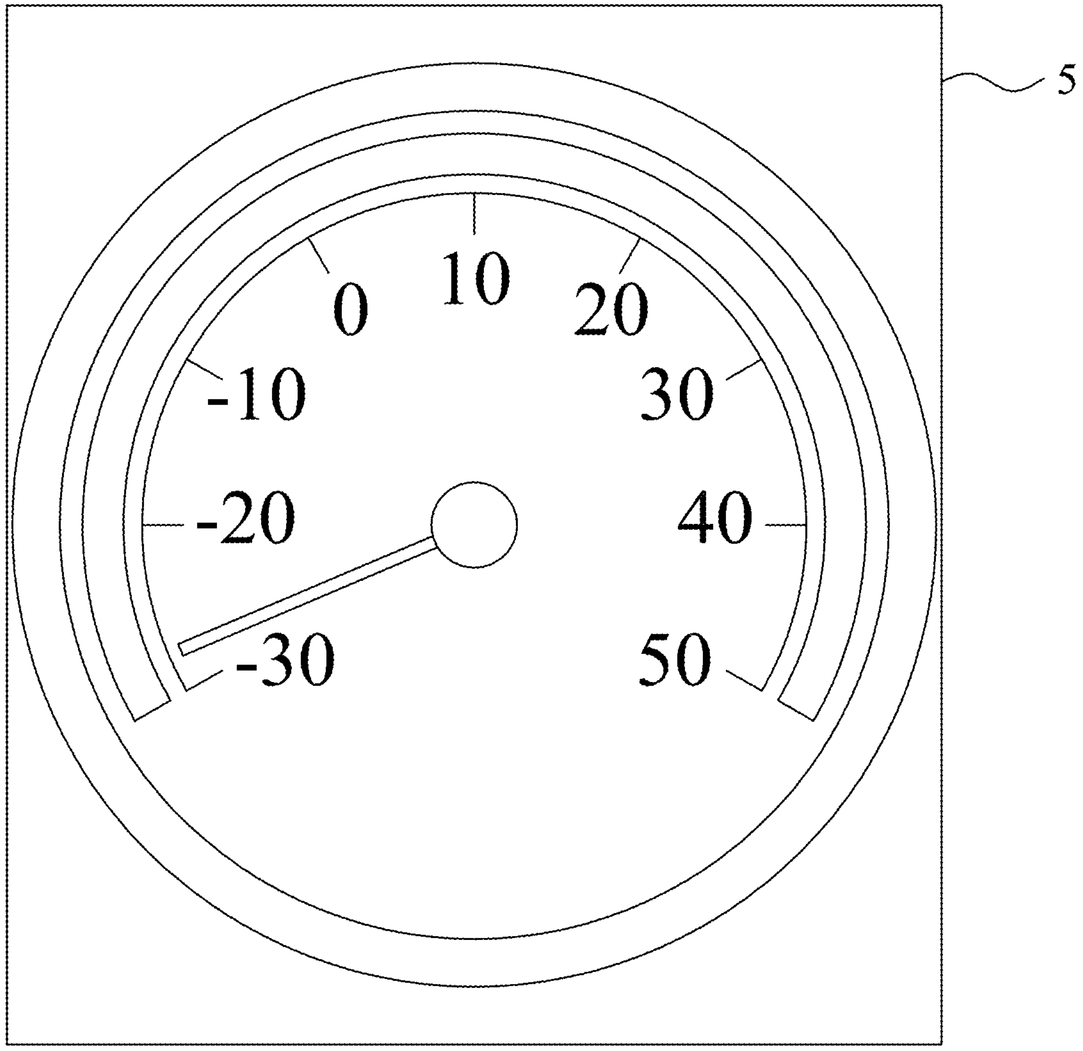
FIG. 5 shows a target image captured by a mobile camera device that has been adjusted according to the initial image.

Further referring to FIG. 5, in step S4, in response to receipt of the adjustment instruction from the control device 1, the mobile camera device 2 rotates the 2D mirror 222 to the target angle based on the adjustment instruction. Specifically, the control unit 23 of the mobile camera device 2, in response to receipt of the adjustment instruction, rotates an angle of the 2D mirror 222 to the target angle, controls the long distance camera module 221 to capture a target image 5 (see FIG. 5) of the target angle through the 2D mirror 222, and transmits the target image 5 that is related to the target object at the actual location to the control device 1. With the abovementioned steps, the mobile camera device 2 may accurately and clearly capture the target image 5 of the target object.

It should be noted that, in a case that the reference image has another partial image that is related to another target object, the control device 1 will select another one of the TBS position data sets that is related to said another target object, and repeats steps S2 to S4 again to obtain another target image for said another target object with said another one of the TBS position data sets as the target position data set. That is to say, when one of the TBS images has two or more target objects, in order to obtain the target images respectively for the target objects, the same one of the TBS images will be selected as the reference image for all of the target objects.

In response to receipt of the target image 5, the control device 1 may perform image recognition on the target image 5 using technologies including, but not limited to, optical character recognition (OCR) technology and/or artificial intelligence (AI) image recognition technology, to obtain characters from the target image 5. By doing so, the control device 1 may achieve automatic meter reading (AMR) by controlling the mobile camera device 2 to move to the actual location of the target object and obtaining a reading of the target object such as a reading of the meter. In other cases, when the target object is not a meter but is an article to be inspected such as a circuit board or a workpiece, the control device 1 may also use the OCR technology and/or AI image recognition technology to perform inspection in order to detect abnormal condition of the target object presented in the target image 5.

When multiple ones of the TBS checkpoints are selected in the digital map, the control device 1 may control the mobile camera device 2 to perform steps S2 to S4 in FIG. 1 multiple times until multiple target images that correspond respectively to the multiple ones of the TBS checkpoints selected are obtained respectively at the actual locations that correspond respectively to the multiple ones of the TBS checkpoints and the multiple target images are all transmitted to the control device 1, thereby achieving automatic inspection.

Figure 6:
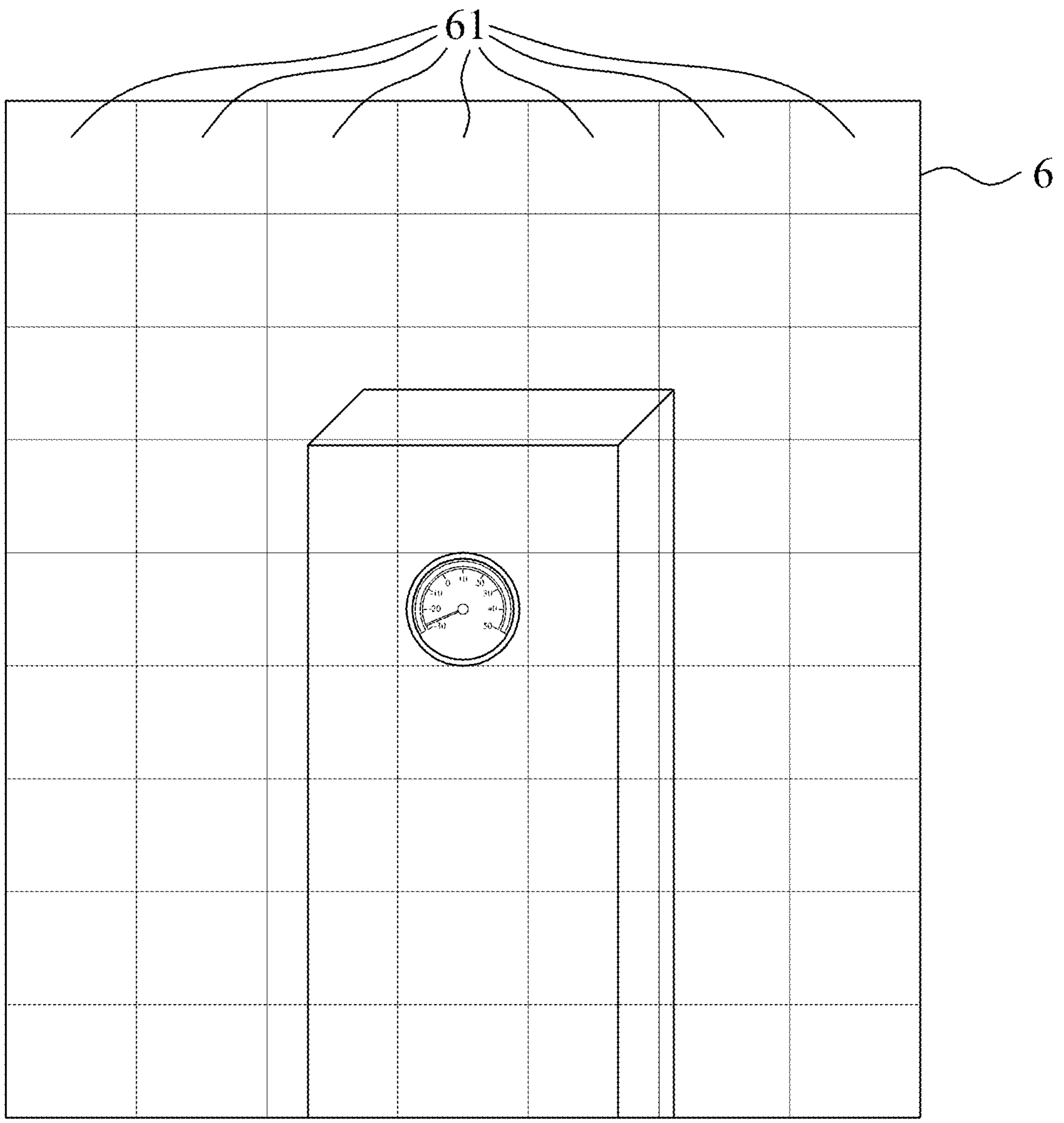
FIG. 6 shows an initial image obtained by merging a plurality of field images captured by the mobile camera device according to another embodiment of this disclosure.

Referring to FIG. 6, in some embodiments where the large FOV camera module 223 is omitted, step S2 of the method includes the control device 1 obtaining the initial image 6 by the control device 1 controlling the 2D mirror 222 of the mobile camera device 2 to rotate to different angles within a rotation range of the 2D mirror 222. Each time the 2D mirror 222 is rotated to one of the different angles, the control device 1 controls the long distance camera module 221 of the mobile camera device 2 to capture a field image 61 of said one of the different angles so as to obtain a plurality of field images 61 that do not overlap each other. Then, the control device 1 merges the field images 61 thus captured to form the initial image 6.

In sum, in the abovementioned embodiment, the control device 1 generates the adjustment instruction based on the target position data set and the discrepancy between the initial image 4, 6, and the reference image 3. The 2D mirror 222 is rotated to the target angle based on the adjustment instruction, so that the long distance camera module 221 may capture the target image 5 that is as similar to the partial image 31 of the reference image 3 as possible. Therefore, the mobile camera device 2 is able to clearly capture the target image of the target object, which may be used later by the control device 1 to perform image recognition to obtain the characters or to detect abnormal condition of the target object presented. Aside from being able to address the problems of manually reading/recording the meters, the embodiment presented in this disclosure is able to accurately obtain target information (e.g., reading the meter of the target object) according to a desired inspection routine. The method as disclosed in this disclosure, in addition to being able to be implemented on AGV, may also be applied to mobile robots such as food delivery robots or humanoid robots in order to achieve the objective of this disclosure. Furthermore, the system of this disclosure can also be applied in public environments such as logistics, retail, and medical institutions, where the mobile robots that implement the system of this disclosure is enabled to operate with minimal movement, thereby significantly conserving energy.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for automatically acquiring target information, the method is to be implemented by a system that includes a control device and a mobile camera device, the mobile camera device including a camera that has a long distance camera module and a two-dimensional (2D) mirror, the 2D mirror being configured to rotate to different angles to allow the long distance camera module to capture images of different angles through the 2D mirror, the control device storing a reference image, a reference coordinate set, a reference shooting data set, and a target position data set that are related to the reference image, the reference coordinate set corresponding to an actual location in a space, the reference image being captured by the mobile camera device at the actual location using the reference shooting data set, the target position data set being position data related to a position of a partial image of the reference image within the reference image, the partial image corresponding to a target object in the space, the method comprising:

the control device controlling the mobile camera device to move to the actual location in the space according to the reference coordinate set, and controlling the mobile camera device to obtain an initial image using the reference shooting data set;

the control device, in response to obtaining the initial image, determining a discrepancy between the initial image and the reference image;

the control device generating an adjustment instruction based on the target position data set and the discrepancy between the initial image and the reference image, and transmitting the adjustment instruction to the mobile camera device;

the mobile camera device, in response to receipt of the adjustment instruction, rotating the 2D mirror to a target angle based on the adjustment instruction; and the mobile camera device, after rotating an angle of the 2D mirror to the target angle, controlling the long distance camera module to capture a target image of the target angle through the 2D mirror, and transmitting the target image to the control device, the target image being related to the target object at the actual location.

2. The method as claimed in claim 1, wherein the control device controlling the mobile camera device to obtain the initial image includes:

the control device controlling the 2D mirror of the mobile camera device to rotate to different angles within a rotation range of the 2D mirror;

each time the 2D mirror is rotated to one of the different angles, the control device controlling the long distance camera module of the mobile camera device to capture a field image of said one of the different angles so as to obtain a plurality of field images that do not overlap each other; and the control device merging the plurality of field images thus captured to form the initial image.

3. The method as claimed in claim 1, the camera further has a large field-of-view (FOV) camera module, wherein the control device controlling the mobile camera device to obtain the initial image includes controlling the large FOV camera module to directly capture the initial image.

4. The method as claimed in claim 1, further comprising:

the control device, in response to receipt of the target image, performing image recognition on the target image so as to undertake one of a first action of obtaining characters from the target image, and a second action of detecting abnormal condition of the target object presented in the target image, wherein performing image recognition on the target image includes using one of an optical character recognition (OCR) technology and an artificial intelligence (AI) image recognition technology to perform image recognition on the target image.

5. The method as claimed in claim 1, wherein the control device further stores a digital map of the space, the reference coordinate set is a coordinate set of a current check point in the digital map, and the current checkpoint corresponds to the actual location in the space.

6. The method as claimed in claim 5, the digital map including a plurality of to-be-selected (TBS) checkpoints, the control device storing a plurality of TBS coordinate sets corresponding respectively to the TBS checkpoints, a plurality of TBS images corresponding respectively to the TBS coordinate sets, a plurality of TBS shooting data sets corresponding respectively to the TBS images, and a plurality of TBS position data sets corresponding respectively to the TBS images, the method further comprising, the control device, before controlling the mobile camera device to move to the actual location, and in response to a selection of the current checkpoint from among the TBS checkpoints, selecting one of the TBS images that corresponds to the current checkpoint as the reference image, selecting one of the TBS coordinate sets that corresponds to the reference image as the reference coordinate set, selecting one of the TBS shooting data sets that corresponds to the reference image as the reference shooting data set, and selecting one of the TBS position data sets that corresponds to the reference image as the target position data set.

7. A system for automatically acquiring target information, comprising:

a control device that stores a reference image, a reference coordinate set, a reference shooting data set, and a target position data set that are related to the reference image, the reference coordinate set corresponding to an actual location in a space, the reference image being captured at the actual location using the reference shooting data set, the target position data set being position data related to a position of a partial image of the reference image within the reference image, and the partial image corresponding to a target object in the space; and a mobile camera device electrically coupled with and controlled by said control device, and including a camera that includes a long distance camera module, and a two-dimensional (2D) mirror configured to rotate to different angles to allow said long distance camera module to capture images of different angles through said 2D mirror, wherein said control device is configured to control said mobile camera device to capture the reference image, control said mobile camera device to move to the actual location in the space according to the reference coordinate set, and control said mobile camera device to obtain an initial image using the reference shooting data set, in response to obtaining the initial image, determine a discrepancy between the initial image and the reference image, and generate an adjustment instruction based on the target position data set and the discrepancy between the initial image and the reference image, and transmit the adjustment instruction to said mobile camera device, wherein said mobile camera device is configured to in response to receipt of the adjustment instruction, rotate said 2D mirror to a target angle based on the adjustment instruction, and after rotating an angle of said 2D mirror to the target angle, control said long distance camera module to capture a target image of the target angle through said 2D mirror, and transmit the target image to said control device, the target image being related to the target object at the actual location.

8. The system as claimed in claim 7, wherein said control device controlling said mobile camera device to obtain the initial image includes, by said control device:

controlling said 2D mirror of said mobile camera device to rotate to different angles within a rotation range of said 2D mirror;

each time said 2D mirror is rotated to one of the different angles, controlling said long distance camera module of said mobile camera device to capture a field image of said one of the different angles so as to obtain a plurality of field images that do not overlap each other; and merging the plurality of field images thus captured to form the initial image.

9. The system as claimed in claim 7, wherein said camera further includes a large field-of-view (FOV) camera module, and said mobile camera device is further configured to control said large FOV camera module to directly capture the initial image.

10. The system as claimed in claim 7, wherein said control device is further configured to, in response to receipt of the target image, perform image recognition on the target image so as to undertake one of a first action of obtaining characters from the target image, and a second action of detecting abnormal condition of the target object presented in the target image; and wherein said control device is configured to use one of an optical character recognition (OCR) technology and an artificial intelligence (AI) image recognition technology to perform image recognition on the target image.

11. The system as claimed in claim 7, wherein said control device further stores a digital map of the space, the reference coordinate set is a coordinate set of a current checkpoint in the digital map, and the current checkpoint corresponds to the actual location in the space.

12. The system as claimed in claim 11, wherein the digital map includes a plurality of to-be-selected (TBS) checkpoints, and said control device further stores a plurality of TBS coordinate sets corresponding respectively to the checkpoints, a plurality of TBS images corresponding respectively to the TBS coordinate sets, a plurality of TBS shooting data sets corresponding respectively to the TBS images, and a plurality of TBS position data sets corresponding respectively to the TBS images, wherein said control device is further configured to, in response to a selection of the current checkpoint from among the TBS checkpoints, and before controlling said mobile camera device to move to the actual location, select one of the TBS images that corresponds to the checkpoint as the reference image, select one of the TBS coordinate sets that corresponds to the reference image as the reference coordinate set, select one of the TBS shooting data sets that corresponds to the reference image as the reference shooting data set, and select one of the TBS position data sets that corresponds to the reference image as the target position data set.

* * * * *